US012423655B2

(12) United States Patent
McLean et al.

(10) Patent No.: US 12,423,655 B2
(45) Date of Patent: *Sep. 23, 2025

(54) ROSTER MANAGEMENT ACROSS ORGANIZATIONS

(71) Applicant: Microsoft Technology Licensing, LLC, Redmond, WA (US)

(72) Inventors: Michael Thomas McLean, Snoqualmie, WA (US); Ladislau Conceicao, Redmond, WA (US); Priyank Deepak Sanghavi, Redmond, WA (US); Li Li, Sammamish, WA (US); Jayant Kishorbhai Manglani, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/396,387

(22) Filed: Dec. 26, 2023

(65) Prior Publication Data
US 2024/0127185 A1    Apr. 18, 2024

Related U.S. Application Data

(63) Continuation of application No. 17/490,096, filed on Sep. 30, 2021, now Pat. No. 11,893,540.

(51) Int. Cl.
*G06Q 10/101*     (2023.01)
*G06Q 10/10*      (2023.01)
(Continued)

(52) U.S. Cl.
CPC ......... *G06Q 10/101* (2013.01); *G06Q 10/103* (2013.01); *H04L 12/1822* (2013.01); *H04L 63/08* (2013.01); *H04L 63/102* (2013.01)

(58) Field of Classification Search
None
See application file for complete search history.

(56) References Cited

U.S. PATENT DOCUMENTS 10,614,159 B2 *   4/2020   Apps ................. H04L 12/6418
10,623,451 B2 *   4/2020   Rathod .................. H04L 51/04
(Continued)

OTHER PUBLICATIONS

First Examination Report Received for Indian Application No. 202447014618, mailed on Jul. 2, 2025, 07 Pages.

*Primary Examiner* — Phyllis A Book
(74) *Attorney, Agent, or Firm* — Schwegman Lundberg & Woessner, P.A.

(57) ABSTRACT

Systems and methods for generating a shared collaborative channel for collaboration are provided. In particular, a computing device may receive a request, from an originating member of an organization, to create the shared collaborative channel, the request including an invitee to be added to the shared collaborative channel. In response to receipt of the request, the computing device may provision a substrate group by creating a container associate with the shared collaborative channel including a substrate database associated with the shared collaborative channel, generate an invitation including a custom link to the shared collaborative channel for the invitee, and determine whether the invitee belongs to an originating collaboration team associated with the originating member based on the substrate database. If the invitee belongs to the originating collaboration team, the computing device may further update the substrate group to add the invitee as a new member of the shared collaborative channel.

20 Claims, 12 Drawing Sheets

(51) Int. Cl.
*H04L 9/40* (2022.01)
*H04L 12/18* (2006.01)

(56) References Cited

U.S. PATENT DOCUMENTS

| | | | |
|---|---|---|---|
| 10,805,101 B1* | 10/2020 | Wang | H04L 63/0861 |
| 2002/0075304 A1* | 6/2002 | Thompson | G06Q 10/10 |
| | | | 715/751 |
| 2002/0075305 A1* | 6/2002 | Beaton | G06Q 10/107 |
| | | | 715/751 |
| 2002/0078150 A1* | 6/2002 | Thompson | H04M 7/003 |
| | | | 709/227 |
| 2005/0289471 A1* | 12/2005 | Thompson | H04L 67/14 |
| | | | 715/752 |
| 2007/0192410 A1* | 8/2007 | Liversidge | G06Q 10/10 |
| | | | 709/204 |
| 2009/0204678 A1* | 8/2009 | Shah | G06Q 10/103 |
| | | | 709/206 |
| 2023/0101151 A1* | 3/2023 | van Rensburg | G06T 11/206 |
| | | | 715/753 |

* cited by examiner

ROSTER MANAGEMENT ACROSS ORGANIZATIONS

CROSS-REFERENCE TO RELATED APPLICATIONS

This application is a continuation of U.S. patent application Ser. No. 17/490,096, filed Sep. 30, 2021, the entire disclosure of which is hereby incorporated by reference.

BACKGROUND

A collaborative platform provides a collaborative workspace to allow a team within an organization to stay connected and productive by providing easy access to team members, documents, and information. Expanded connectivity enables team members to make informed decisions and improve efficiency. Recent enhancements in collaboration platforms, further improve upon sharing documents, tracking tasks, e-mail efficacy, and idea and information sharing. However, oftentimes the collaborative workspace does not provide means to allow collaboration between individuals in different teams within the organization and/or collaboration with individuals or teams outside the organization.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In accordance with at least one example of the present disclosure, a method for generating a shared collaborative channel for collaboration is provided. The method may include receiving a request, from an originating member in an originating organization, to create the shared collaborative channel, the request including an invitee to be added to the shared collaborative channel, in response to receiving the request, provisioning a substrate group by creating a container including a substrate database associated with the shared collaborative channel, the substrate database including a membership roster of the shared collaborative channel, generating an invitation including a custom link for accessing the shared collaborative channel by the invitee, the custom link indicating an identity of the invitee, based on the identity of the invitee, determining whether the invitee belongs to the originating organization based on an organizational database, and in response to determining that the invitee belongs to the originating organization, (i) updating the membership roster of the substrate database to add the invitee as a new member of the shared collaborative channel and (ii) based on the custom link, automatically establishing a linkage for access to the shared collaborative channel by the invitee.

In accordance with at least one example of the present disclosure, a computing device generating a shared collaborative channel for collaboration is provided. The computing device may include a processor and a memory having a plurality of instructions stored thereon that, when executed by the processor, causes the computing device to receive a request, from an originating member of an organization, to create the shared collaborative channel, the request including an invitee to be added to the shared collaborative channel, in response to receipt of the request, provision a substrate group by creating a container associate with the shared collaborative channel including a substrate database associated with the shared collaborative channel, the substrate database including a membership roster of the shared collaborative channel, generate an invitation including a custom link to the shared collaborative channel for the invitee, determine whether the invitee belongs to an originating collaboration team associated with the originating member based on the substrate database, and in response to a determination that the invitee belongs to the originating collaboration team, update the substrate group to add the invitee as a new member of the shared collaborative channel.

In accordance with at least one example of the present disclosure, a non-transitory computer-readable medium storing instructions for generating a shared collaborative channel for collaboration is provided. The instructions when executed by one or more processors of a computing device, cause the computing device to perform operations, including receiving a request, from an originating member in an originating organization, to create the shared collaborative channel, the request including an invitee to be added to the shared collaborative channel, in response to receiving the request, provisioning a substrate group by creating a container including a substrate database associated with the shared collaborative channel, the substrate database including a membership roster of the shared collaborative channel, generating an invitation including a custom link for accessing the shared collaborative channel by the invitee, the custom link indicating an identity of the invitee, based on the identity of the invitee, determining whether the invitee belongs to an originating organization based on an organizational database, and in response to determining that the invitee belongs to the originating organization updating the membership roster of the substrate database to add the invitee as a new member of the shared collaborative channel, wherein the substrate group is associated with an independent identity management directory that includes a list of members that are authorized to access resources or content associated with the shared collaborative channel.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
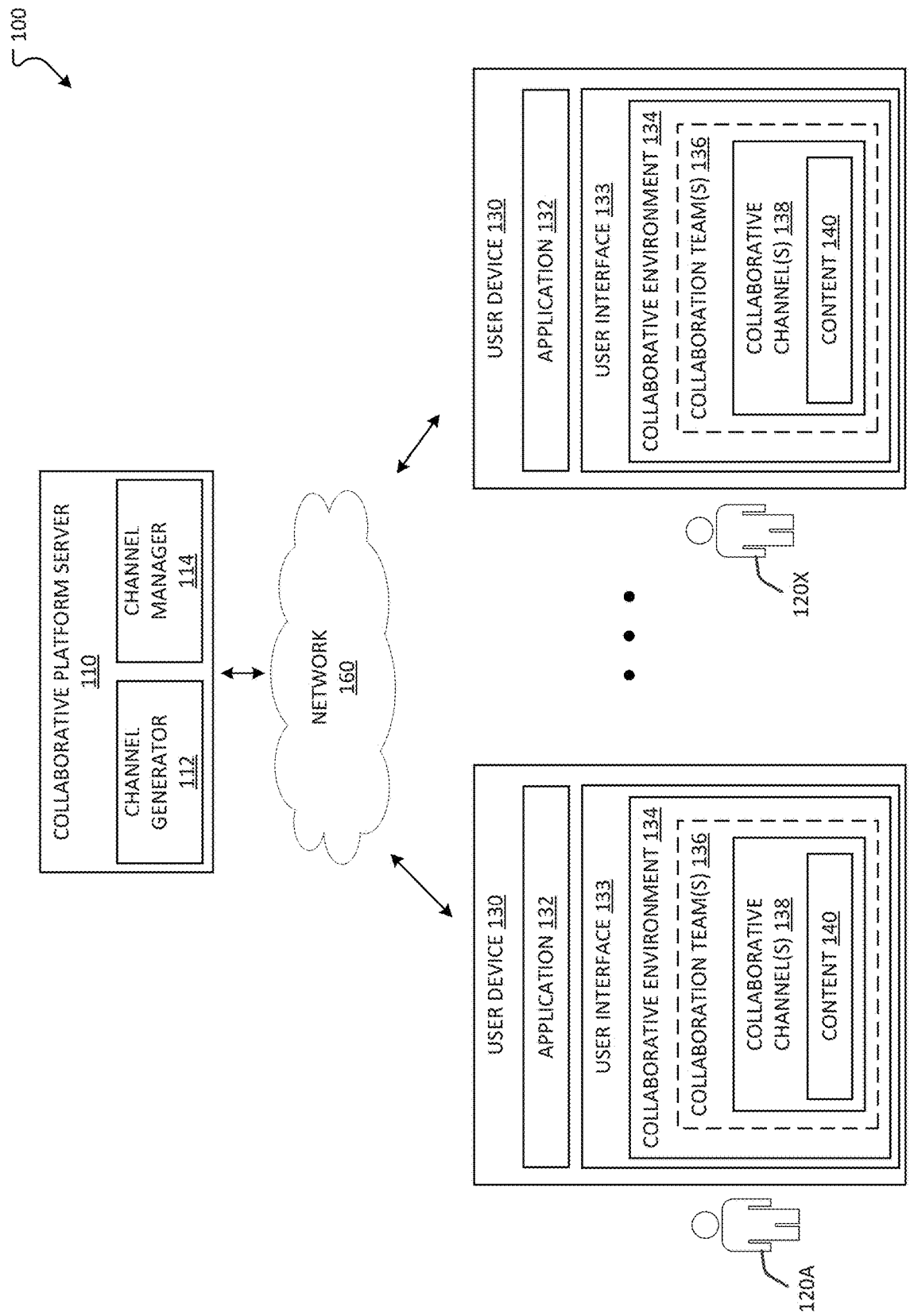
FIG. 1 depicts details directed to a collaborative communication system for facilitating collaboration between users in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In accordance with examples of the present disclosure, a collaborative communication system allows individuals or collaboration teams in an organization (also referred to as a tenant) to create a collaborative enterprise environment on a collaborative platform (e.g., Microsoft® Teams®) with other individuals or collaboration teams within the organization and/or with other individuals or collaboration teams that belong to a different organization. Each user of the collaborative platform may customize the user's collaborative environment. Each collaboration team includes a group of team members and may have more than one collaborative channel shared among the team members. For example, a member of a collaboration team in an organization may create a collaborative channel to work on a project with other individuals in the same collaboration team and/or one or more members from a different collaboration team in the same organization. Collaboration may involve phone calls (e.g., IP-based calls), chat threads, email threads, channel conversations, document sharing, task tracking, scheduled meetings, and the like. Additionally, or alternatively, the collaborative channel may be shared with one or more individuals or teams outside of the organization (e.g., an external organization).

Each individual who has been invited or added to the collaborative channel may be assigned a specific set of rights (e.g., to access and interact with content in the collaborative channel) based at least in part on a type of the collaborative channel and an identity of the individual (e.g., within or outside the collaboration team, internal or external of the organization). For example, the type of a collaborative channel (e.g., standard, private, and shared) may be defined by an individual when creating the collaborative channel (also referred to as an owner of the collaborative channel). It should be appreciated that, in some aspects, the owner and/or one or more authorized members of the collaborative channel may modify the type of collaborative channel after the collaborative channel has been created. Additionally, it should also be appreciated that there may be multiple owners associated with the collaborative channel and owners may have additional authority to make changes to the collaborative channel than other members. As described above, regardless of the type of collaborative channel, an individual who is not a member of the collaboration team may be invited and/or added to the collaborative channel as a channel-only member. Additionally, in some aspects, a member of the collaboration team may also be explicitly added to a particular collaborative channel as a channel-only member. In such aspects, if the member is removed from the collaboration team, the member will retain access to the particular collaborative channel to which the member was added as the channel-only member.

As described above, the type of a collaborative channel may include standard, private, and shared. The standard collaborative channel is configured to establish an open collaboration within the collaboration team and inherits a roster (e.g., a full membership list) corresponding to the collaboration team. In other words, the standard collaborative channel and its contents are visible to every team member in the collaboration team. Even so, the owner of the collaborative channel may still maintain more rights than the other team members, such as rights to make changes to the roster, schedule meetings, grant rights to other members, and the like. It should be appreciated that, in some aspects, the standard collaborative channel may be public. For example, users in the same organization may access content in standard public channels.

The private collaborative channel is a channel where membership may be a subset of the team members in a collaboration team and/or a subset of members of an organization more broadly. The private collaborative channel and its contents are hidden from other team members (or organization members) who are not members of the private collaborative channel. For example, anyone in the collaboration team may create a private collaborative channel and invite one or more particular team members in the collaboration team to access the private collaborative channel. In fact, a team owner (e.g., a person who created the collaboration team) may not be a member of the private collaborative channel.

The shared collaborative channel allows cross-team collaboration between multiple collaborative teams within the same organization or across multiple organizations. The shared collaborative channel allows members in different teams to collaborate as if they were all members of the same collaboration team. When a shared collaborative channel is created, the originating member may be referred to as an originating owner. The originating owner is a member of an originating organization (e.g., internal organization) and may be (but is not required to be) a member of an internal collaboration team, for instance. The originating owner may invite members to the shared collaborative channel from different collaboration teams (e.g., internal collaboration teams) within the same organization (e.g., internal organization) and/or may invite members from different organizations (e.g., external organizations). If a member is associated with the same organization as the originating owner, the member is an internal member; whereas if a member is not associated with the same organization as the originating owner, the member is an external member. An internal member may be granted rights of an owner by the originating owner, which may include some or all of the rights held by the originating owner. In aspects, an external member may be granted rights as an external owner, but may not be granted all of the rights of an internal designated owner or the originating owner. That is, an external designated owner may not have rights to add or remove internal members from the membership roster of the shared collaborative channel but may have rights to add or remove external members (e.g., users from the same organization as the external designated owner). For example, if Organization A is collaborating with an external consulting firm like Organization B on a project, Organization A may not know how many individuals Organization B has allocated or when consultants will roll on or off the project. In such an example, Organization A may delegate managing a list of users within Organization B to an external owner member of Organization B. This allows Organization A to easily collaborate with Organization B without having to identify and update each and every consultant that rotates throughout the project.

Figure 4A:
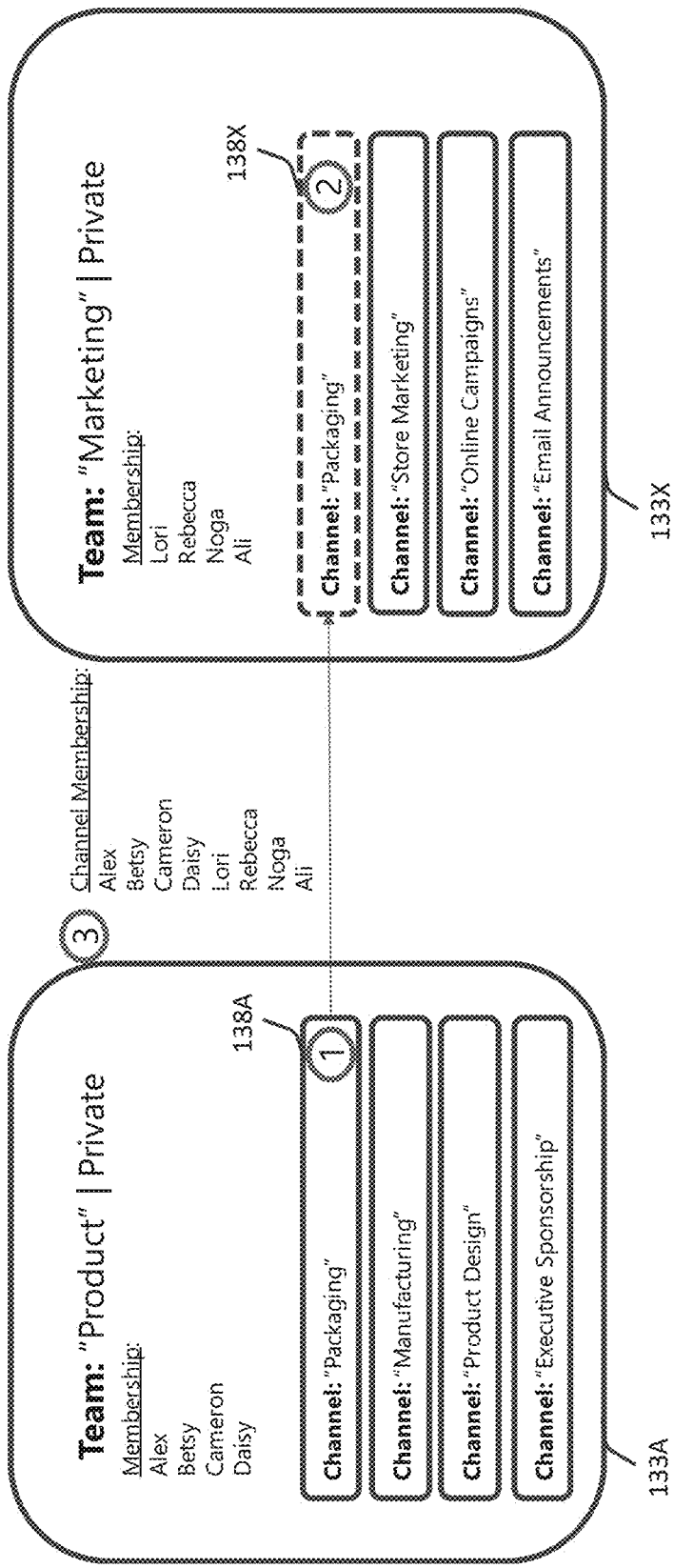
FIGS. 4A and 4B depict example user interfaces of computing devices when a collaborative channel is shared between an originating team and a recipient team in accordance with examples of the present disclosure.
Figure 4B:
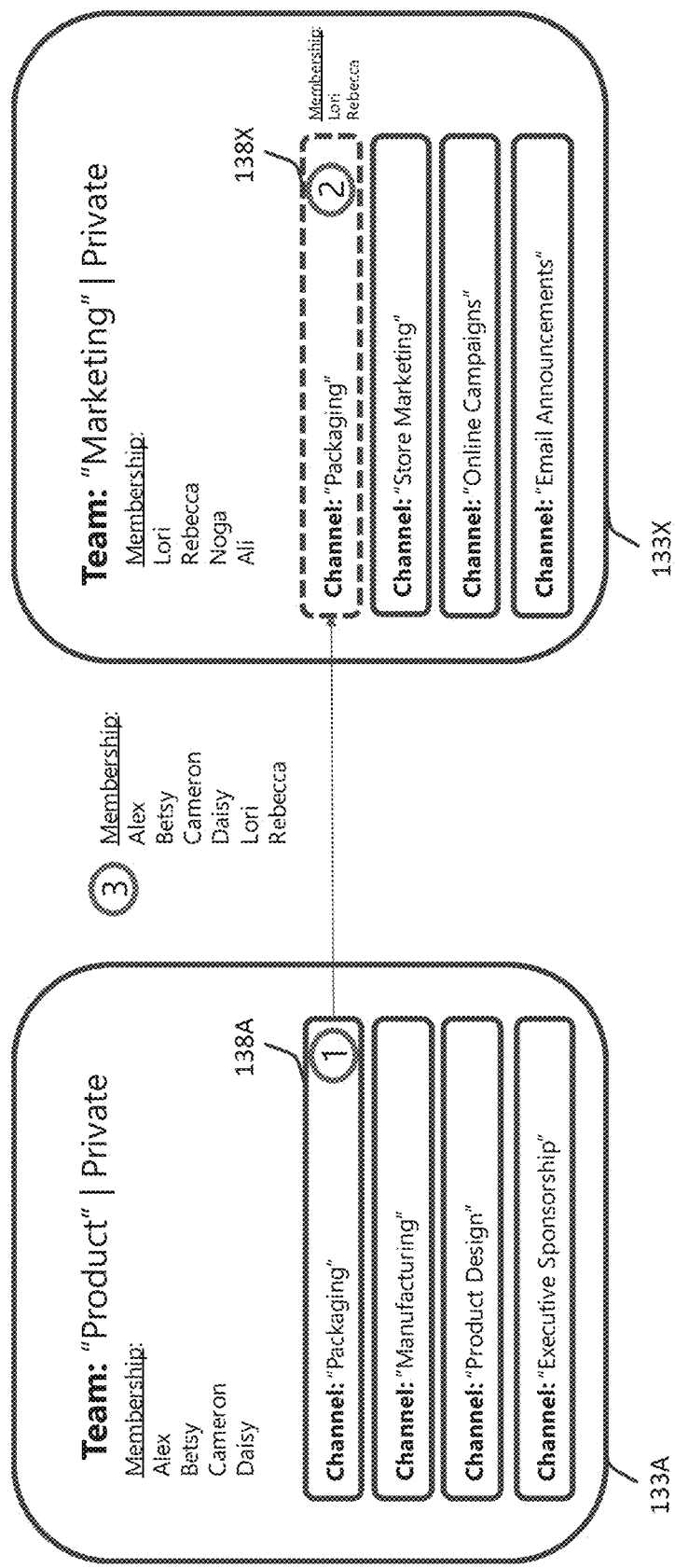

Additionally, each member of a shared collaborative channel may choose to add or link the shared collaborative channel directly to one or more of the member's collaboration teams (e.g., a member's primary collaboration team), as shown in FIGS. 4A and 4B. This prevents the member from needing to move out of context from one collaboration team to view content in the shared collaborative channel, which may be associated with a different collaboration team of the same organization or with a different organization entirely. It should be appreciated that edits (e.g., additions, deletions, changes) made to the content in the collaborative channel may be reflected in near real-time across user systems. For example, while an edit is being made to the content on one user system, the edit may be reflected at substantially (or nearly) the same time on another user system. "Near" real-time (or substantially real-time) may account for a minimal delay associated with transmission and synchronization of changes due to resource availability, processing speeds, network bandwidth, and the like.

In the illustrative aspect, when a new private or shared collaborative channel is created, a new substrate group may be provisioned within a resource tenant (i.e., where the new private or shared collaborative channel lives). The new substrate group is associated with the new collaborative channel and serves as an authority for membership (e.g., an identity management directory) inside the new collaborative channel. For example, the substrate group may contain a roster that includes a list of users and computers that are authorized to access resources or content associated with the collaborative channel. As such, a direct mapping (e.g., a 1:1 mapping) is established between the collaborative channel and the substrate group. The substrate group includes a substrate database for storing content (e.g., membership, messages, calendar entries) that is shared between members of the associated collaborative channel. Such content may be received, uploaded, or otherwise generated by the members and may be made available to multiple applications accessible by the members, including the collaborative platform, a calendar/messaging application, a planner application, a notebook application, and the like. It should be appreciated that the substrate group is independent from other identity management directories (e.g., Azure Active Directory) that may be associated with the collaboration team.

By creating a collaborative channel with its own substrate group, an individual may be added to a specific collaborative group (e.g., channel-only members) for collaboration without being a member of the collaboration team. This allows the collaborative communication system to limit the access of channel-only members to content of the specific collaborative channel only. It should be appreciated that this is a significant improvement over current collaborative systems where all channels within a collaboration team share the same roster (e.g., same identity management directory) and the same substrate database, which in the case of a shared channel would result in all members, including users outside of the resource tenant (i.e., from different tenants), to have at least read access all content of the collaborative team. By bifurcating the membership roster of a shared collaborative channel from the general organizational directories, additional flexibility in assigning content permissions (e.g., read/write) and/or channel rights (e.g., changing membership, adding tasks, scheduling meetings, etc.) to both internal and external members can be achieved.

It should be appreciated that although, for example purposes, described embodiments generally relate to applications, e.g., such as email applications, chat applications, collaborative platforms, and the like, the present methods and systems are not so limited. For example, collaboration content described herein may be used to provide collaborative experiences in applications other than messaging applications, such as word processing applications, spreadsheet applications, notebook applications, presentation applications, instant messaging or chat applications, social networking platforms, and the like.

Referring now to FIG. 1, an example collaborative communication system 100 for facilitating collaborations between users is provided, in accordance with an embodiment of the present disclosure. To do so, the collaborative communication system 100 includes a collaborative platform server 110 that is communicatively coupled to a plurality of computing devices 130 associated with users (e.g., members) 120 in via a network 160. The network 160 may include any kind of computing network including, without limitation, a wired or wireless local area network (LAN), a wired or wireless wide area network (WAN), and/or the Internet.

Specifically, FIG. 1 illustrates an overview of an example collaborative communication system 100 through which a member of a collaboration team 136 in an organization may collaborate with another member within or outside of the collaboration team 136 in the same or different organization via a collaborative platform server 110. The collaborative platform server 110 is associated with a collaborative platform, such as Microsoft Teams. In the illustrative aspect, the collaborative platform server 110 includes a channel generator 112 and a channel manager 114. The channel generator 112 may create a shared collaborative channel 138 for sharing content between internal or external members of the collaboration team 136. The channel manger 114 may manage memberships and access permissions of the shared collaborative channel 138. However, as described above, in some examples, the shared collaborative channel may be generated as a standalone channel that is not associated with a collaborative team in the organization.

Content 140 may be shared and/or updated by one or more members of the shared collaborative channel 138 via an application 132 that is communicatively coupled to the collaborative platform server 110. For example, the content may include documents, agenda items, calendar items, action or task items, notes, or the like. It should be appreciated that any content (e.g., materials, documents, data, etc.) discussed or shared during a collaboration session may be automatically associated with the respective collaborative channel 138 and commonly stored (e.g., a substrate database associated with the shared collaborative channel) that is accessible only by the members of the shared collaborative channel 138, based on any applicable permissions or rights to the content assigned to each member. In other words, the collaborative communication system 100 may provide a concurrent multi-user interaction and a real-time collaboration between the members of the shared collaborative channel 138—whether inside or outside of an organization.

As described above, each user 120 of the collaborative platform may customize the user's collaborative environment, which is displayable on a user interface 133 of the user device 130. It should be appreciated that each member of the shared collaborative channel 138 may choose where to link or mount the shared collaborative channel 138 within the user's collaborative environment. For example, the shared collaborative channel 138 may be mounted to a particular collaboration team 136 within the user's collaborative environment. As described above, the user may have access to some or all content associated with the shared collaborative channel 138. Additionally, while an owner may have authority to mount the shared collaborative channel 138 to the particular collaboration team 136, members may have limited authority to make changes to the shared collaborative channel 138 or to alter where the channel is mounted. However, it should be appreciated that, in some other aspects, the shared collaborative channel 138 may not be linked to a collaboration team 136 but instead may be linked to the user's collaborative environment as a standalone channel.

Figure 2:
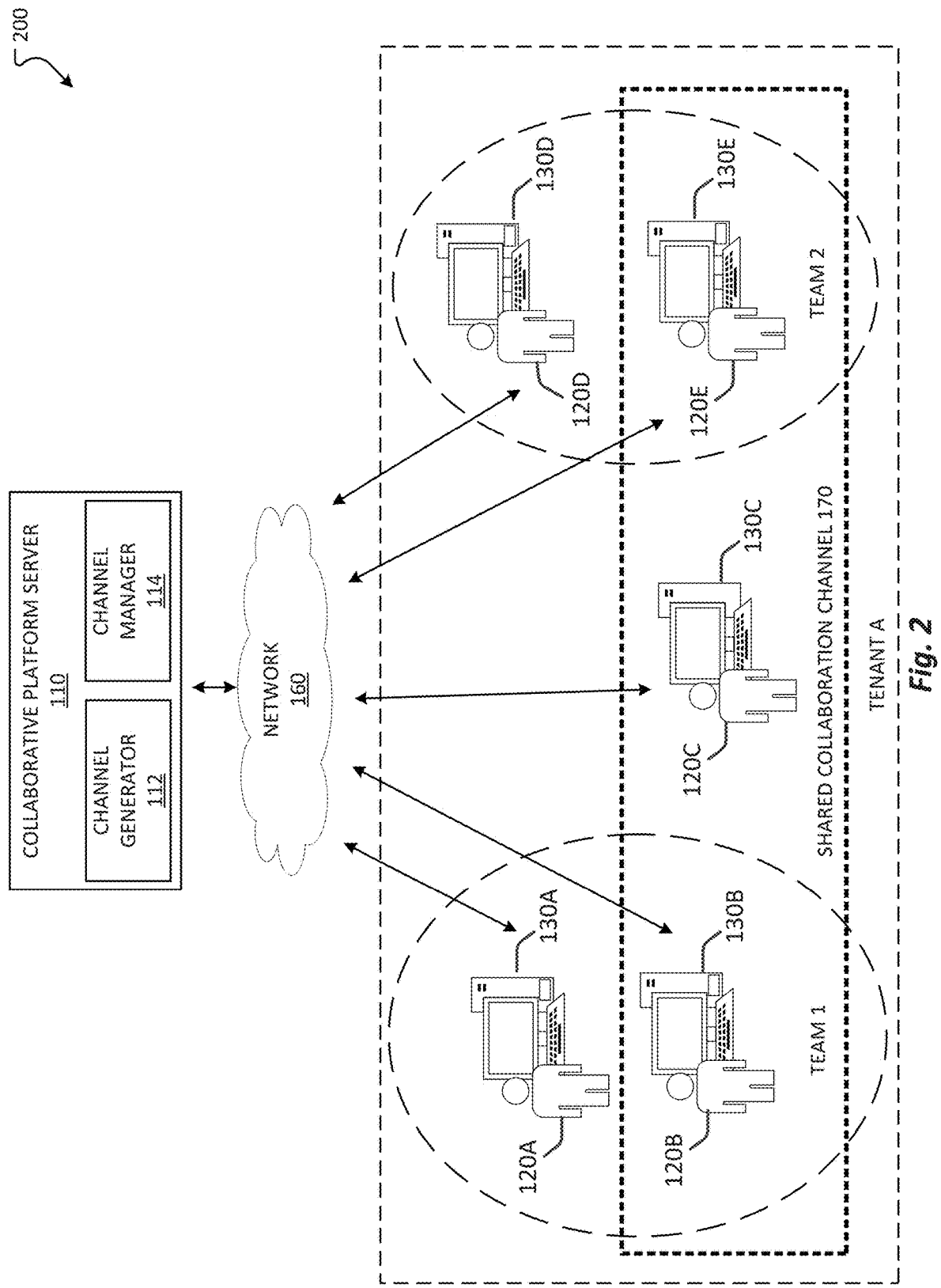
FIG. 2 depicts details directed to a collaborative communication system for facilitating collaboration between collaboration teams within an organization in accordance with examples of the present disclosure.
Figure 3:
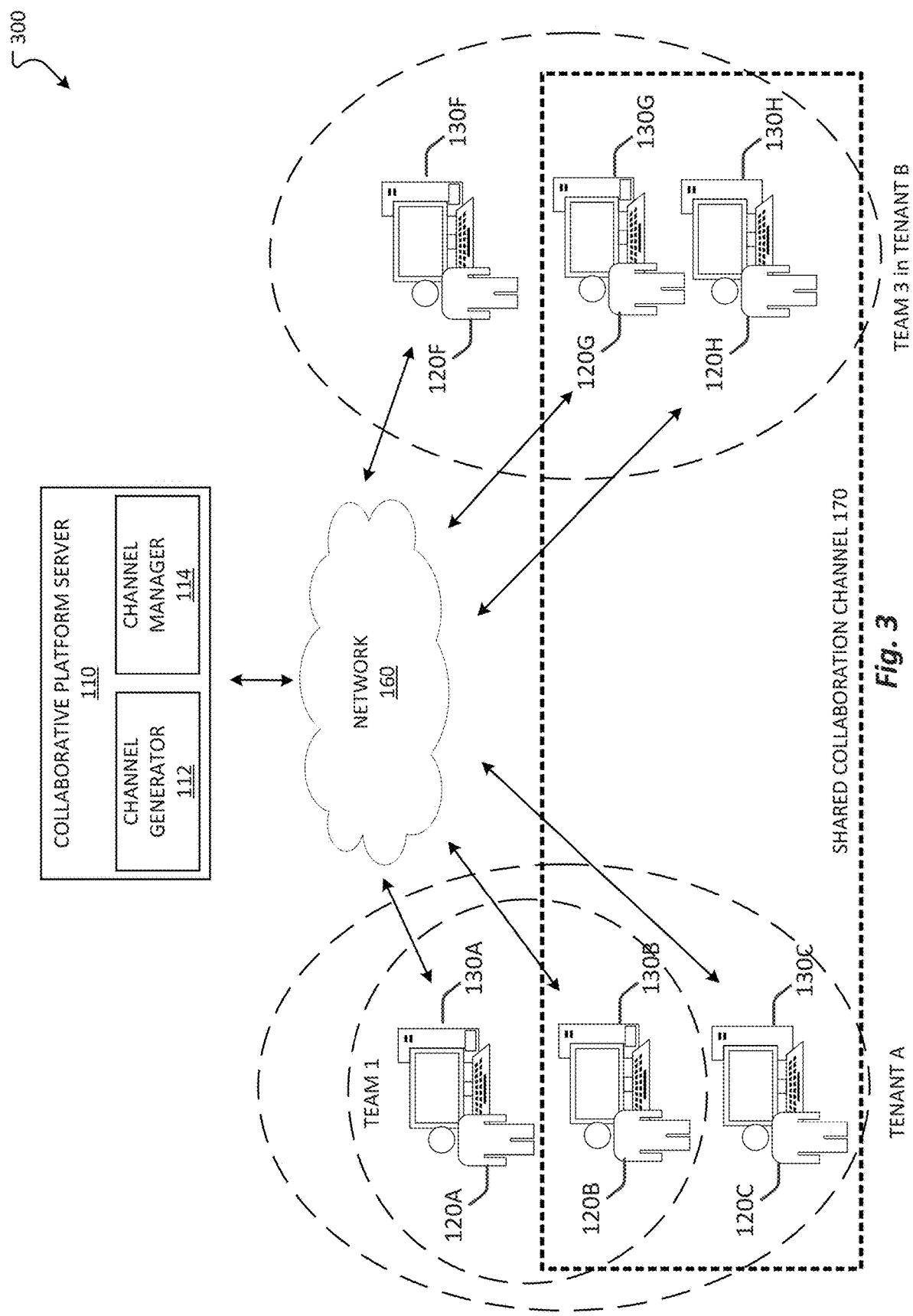
FIG. 3 depicts details directed to a collaborative communication system for facilitating collaboration between individuals and/or teams in different organizations in accordance with examples of the present disclosure.

Referring now to FIGS. 2 and 3, an example shared collaborative channel is illustrated. Specifically, FIG. 2 depicts an example collaborative communication system 200 for facilitating collaborations between different collaboration teams within the same organization, in accordance with an embodiment of the present disclosure. In the illustrative aspect, the collaborative communication system 200 allows a member of one collaboration team in an organization to create a shared collaborative channel 170 on a collaborative platform with other individuals and/or collaboration teams within the same organization. To do so, the collaborative communication system 200 includes a collaborative platform server 110 that is communicatively coupled to a plurality of computing devices 130A-130E associated with users (e.g., members) 120A-120E in the same organization, Tenant A, via the network 160. As described above, the network 160 may include any kind of computing network including, without limitation, a wired or wireless local area network (LAN), a wired or wireless wide area network (WAN), and/or the Internet.

As shown in FIG. 2, Collaboration Team 1 has two team members 120A, 120B. Each team member 120A, 120B has a computing device 130A, 130B that is communicatively coupled to the collaborative platform server 110 to achieve collaboration within Collaboration Team 1. Additionally, Collaboration Team 1 may have more than one collaborative channel shared among the team members 120A, 120B. For example, the team member 120A (also referred to as a host or an originating channel owner from an originating collaboration team) may create a shared collaborative channel to initiate cross-team collaboration with Collaboration Team 2 in the same organization, Tenant A. When the shared collaborative channel is created, the membership of the shared collaborative channel may be defined as an aggregation of members from Collaboration Team 1 (i.e., the originating collaboration team) and Collaboration Team 2 (i.e., a recipient collaboration team). Additionally, the originating channel owner 120A may also invite a member 120C of Tenant A, who is not a member of any collaborative channel, to the shared collaborative channel.

Alternatively, or additionally, as depicted in FIG. 3, an example collaborative communication system 300 may facilitating collaboration between collaboration teams across different organizations (i.e., cross-tenants), in accordance with an embodiment of the present disclosure. Specifically, in the illustrative aspect, the collaborative communication system 300 allows a member of one organization (whether a member of a collaboration team within the organization or not) to create a shared collaborative channel with other individuals and/or collaboration teams from another organization. To do so, the collaborative communication system 300 includes a collaborative platform server 110 that is communicatively coupled to a plurality of computing devices 130A-130C associated with members 120A-120C in Tenant A and a plurality of computing devices 130F-130H associated with members 120F-120H in Tenant B via the network 160.

As shown in FIG. 3, Collaboration Team 1 has three team members 120A, 120B. Each team member has a computing device 130A, 130B that is communicatively coupled to the collaborative platform server 110 to achieve collaboration within Collaboration Team 1. Additionally, Collaboration Team 1 may have more than one collaborative channel shared among the team members 120A, 120B. For example, the team member 120A (also referred to as a host or an originating channel owner from an originating collaboration team) may create a shared collaborative channel to initiate cross-team collaboration with Collaboration Team 3 from a different organization, Tenant B. When the shared collaborative channel is created, the membership of the shared collaborative channel may be defined as an aggregation of members from Collaboration Team 1 (i.e., the originating collaboration team) and Collaboration Team 3 (i.e., a recipient collaboration team). Additionally, the originating channel owner 120A may also invite a member 120C of Tenant A, who is not a member of any collaborative channel, to the shared collaborative channel.

Referring now to FIGS. 4A and 4B, example user interfaces of computing devices when a shared collaborative channel is shared between an originating team (e.g., "Product" Team) and a recipient team (e.g., "Marketing" Team) in accordance with examples of the present disclosure. In the illustrative aspect, when an invitation to a shared collaborative channel is sent to an external collaboration team, the external designated owner of the external collaboration team may only define or modify the scope of the shared collaborative channel for the external collaboration team but not for the members of the internal collaboration team. For example, as illustrated in FIG. 4A, the external designated owner may grant all team members of the external collaboration team access to the shared collaborative channel, in which case, all team members of the external collaboration team are aggregated and added to the channel membership of the shared collaborative channel. In other words, all team members of the external collaboration team can see the shared collaborative channel and can access content of the shared collaborative channel. Alternatively, the external designated owner may select a subset of members from the external collaboration team to be included in the shared collaborative channel, as illustrated in FIG. 4B. In such a case, only the selected team members can see the shared collaborative channel and can access content of the shared collaborative channel.

Figure 4C:
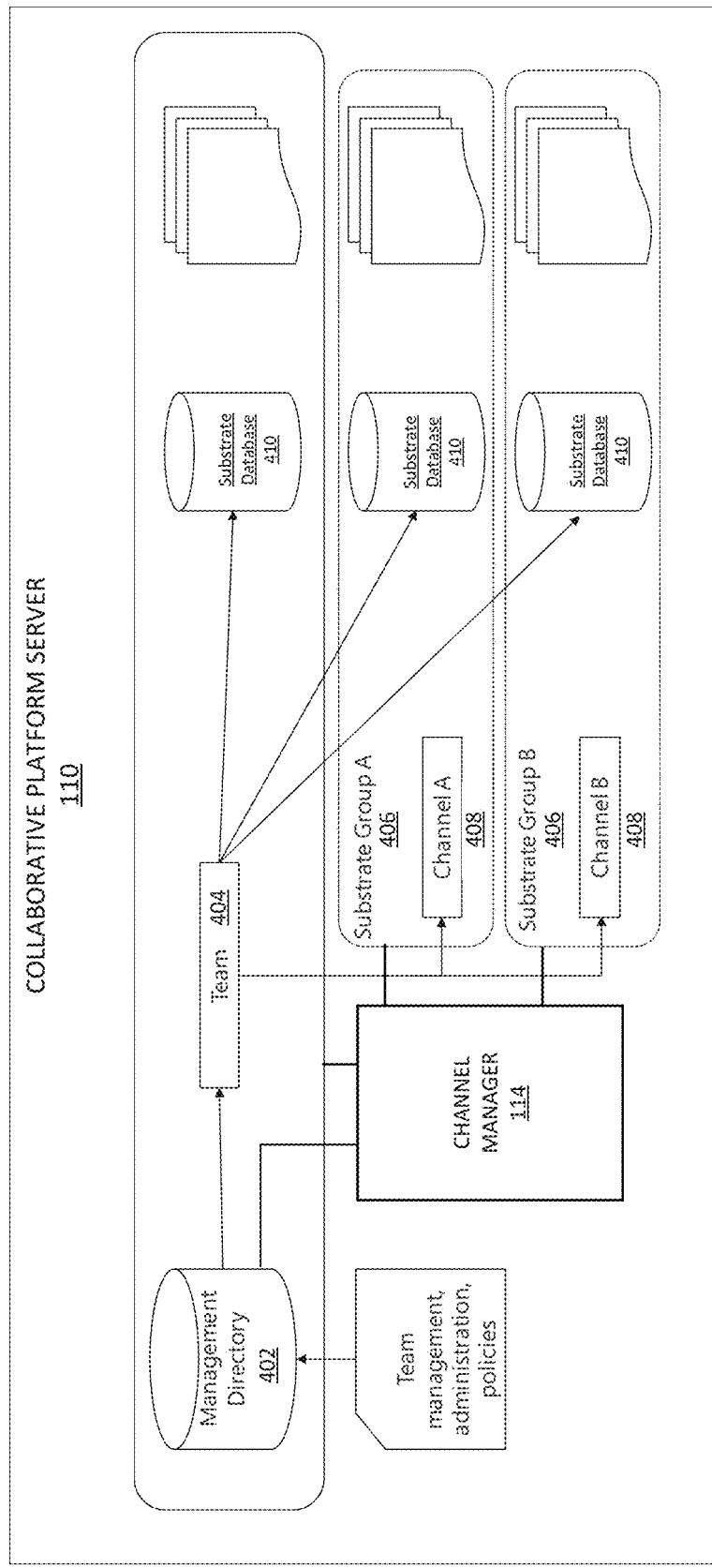
FIG. 4C depicts an example block diagram of a collaborative platform server in accordance with examples of the present disclosure.

Referring now to FIG. 4C, an illustrative block diagram of the collaborative platform server 110 in accordance with examples of the present disclosure is provided. Upon receiving a request to generate a new private or shared collaborative channel, the collaborative platform server 110 provisions a substrate group 406 associated with the new collaborative channel 408. As described above, each substrate group 406 has its own substrate database 410 for storing content (e.g., membership, messages, calendar entries) that are shared between members of the associated collaborative channel. This allows the channel-only members to only access content in the respective substrate database and prevents them from accessing all content of a collaboration team outside of the shared collaborative channel. It should be appreciated that a management directory 402 (e.g., Azure® Active Directory®) may receive and store various data associated with the collaboration team 404, including rules or policies (e.g., authentication and access) related to team management and/or administration. It should be appreciated that this information may be synced down to one or more substrate databases 410.

Figure 5:
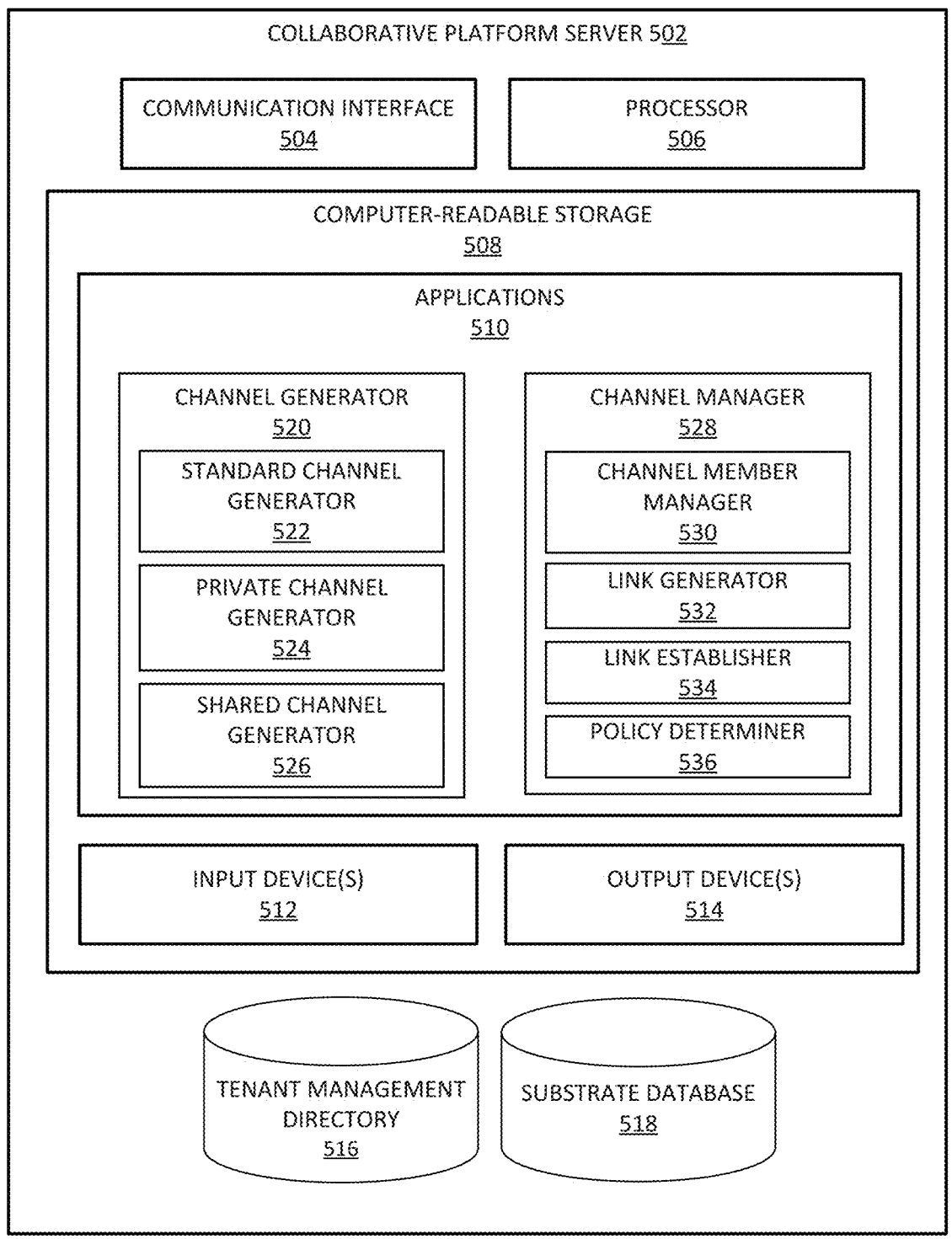
FIG. 5 depicts a block diagram illustrating physical components (e.g., hardware) of a collaborative platform server with which aspects of the disclosure may be practiced.

Referring now to FIG. 5, the collaborative platform server 502 in accordance with examples of the present disclosure is provided. The collaborative platform server 502 may be the same as or similar to the collaborative platform server 110 previously described in FIGS. 1-3. The collaborative platform server 502 may include a communication interface 504, a processor 506, a computer-readable storage 508, one or more input devices 512, and one or more output devices 514. In examples, the communication interface 504 may be coupled to a network and receive a request to generate a collaborative channel.

In examples, one or more applications 510 may be provided by the collaborative platform server 502. The one or more applications 510 may include a channel generator 520 and a channel manager 528. The channel generator 520 may be the same as or similar to the channel generator 112 previously described in FIGS. 1-3. The channel manager 528 may be the same as or similar to the channel manager 114 previously described in FIGS. 1-3.

The channel generator 520 is configured to generate a shared collaborative channel. To do so, the channel generator 520 may provision a substrate group (e.g., 406 in FIG. 4C) associated with the new shared collaborative channel (e.g., 408 in FIG. 4C). As described above, the new substrate group is configured to serve as an authority for membership (e.g., identity management directory) inside the new shared collaborative channel. For example, the substrate group may contain a roster that includes a list of users and computers that are authorized to access resources or content of the shared collaborative channel. As such, a direct mapping (e.g., a 1:1 mapping) is established between the shared collaborative channel and the substrate group. The substrate group is also associated with a substrate database (e.g., 410 in FIG. 4C) for storing content that is shared between members of the new shared collaborative channel. Such content may be received, uploaded, or otherwise generated by the members and may be made available to multiple applications accessible by the members, including the collaborative platform, a calendar/messaging application, a planner application, a notebook application, and the like. It should be appreciated that a substrate database 518 may include a plurality of partitions or otherwise for storing content and a substrate directory for each shared channel associated with a tenant. It should be appreciated that the substrate database 518 is independent from other identity management directories that may be associated with an organization or a collaboration team. Similarly, a tenant management directory 516 may include a plurality of management directories (e.g., Azure Active Directory) that include a general directory for the tenant.

As described above, a collaborative channel may be of a standard, private, or shared type. To do so, the channel generator 520 may further include a standard channel generator 522, a private channel generator 524, and a shared channel generator 526. The standard channel generator 522 is configured to generate a standard collaborative channel for establishing open collaboration within a collaboration team. As described above, the standard collaborative channel inherits a full membership list from the collaboration team and membership is hosted by the tenant management directory 516 (e.g., Azure Active Directory). In other words, the standard collaborative channel and its contents are visible to every team member in the collaboration team. It should be appreciated that, in some aspects, the standard collaborative channel may be public. In this case, the membership roster corresponds to users within the same organization—whether they are members of the same collaboration team or not—and general organizational policies govern each user's access (whether read only or read/write, etc.) to the content of the public channel.

The private channel generator 524 is configured to generate a private collaborative channel where membership is a subset of team members within an organization or within a collaboration team. The private collaborative channel and its contents are hidden from other team members who are not members of the private collaborative channel. For example, anyone in the collaboration team may create a private collaborative channel and invite one or more particular team members in the collaboration team to access the private collaborative channel. In fact, a team owner (e.g., a person who created the collaboration team) may not be a member of the private collaborative channel. However, a private collaboration channel may not be applicable to cross-tenant collaboration as the membership roster (and any associated content) is based on the tenant's organizational (internal) directory (e.g., Azure Active Directory).

The shared channel generator 526 is configured to generate a shared collaborative channel for establishing cross-team collaboration between multiple collaborative teams within the same organization or across different organizations. The shared collaborative channel allows members in different collaboration teams to collaborate as if they were all members of the same collaboration team. When a shared collaborative channel is created, the membership of the shared collaborative channel may be defined as an aggregation of members from origination and recipient collaboration teams, as illustrated in FIG. 4A. It should be appreciated that, in some aspects, an owner designated by the originating owner (e.g., a designated owner) of a recipient collaboration team (either internal or external) may decide which team members from the recipient collaboration team to include in the shared collaborative channel, as illustrated in FIG. 4B.

It should be appreciated that the type of collaborative channel may be defined by an individual who is creating or requesting to create the collaborative channel. In some aspects, the type of collaborative channel may be modified after the collaborative channel is created. Additionally, it should also be appreciated that there may be multiple owners (e.g., an originating owner and one or more designated owners) associated with the collaborative channel who may be allowed to modify the channel type associated with the collaborative channel.

Additionally, the channel manager 528 is configured to manage a collaborative channel generated by the channel generator 520. To do so, the channel manager 528 may further include a channel member manager 530, a link generator 532, a link establisher 534, and a policy determiner 536. The channel member manager 530 is configured to manage membership of each collaborative channel. For example, the channel member manager 530 may monitor and determine if a new member (e.g., a new individual and/or a new collaboration team) is being added to a shared collaborative channel. If the channel member manager 530 determines that a new member is requested to be added to the shared collaborative channel, the channel member manager 530 communicates to the link generator 532 to generate a custom link to the shared collaborative channel.

The link generator 532 is configured to generate a channel link for each invitee who is being invited to a shared collaborative channel. For example, a member of an originating collaboration team from an originating organization may request to create a shared collaborative channel to be shared with one or more invitees. An invitee may be an individual from the same originating collaboration team, an individual from a different collaboration team in the same organization, or an individual from a different organization. Additionally, or alternatively, an invitee may be a collaboration team (e.g., including all members of the collaboration team) from the same organization or a collaboration team from a different organization. To invite another collaboration team from the same organization or a different organization, the request may include an identity of an individual who is a member of that collaboration team and may be granted rights as a designated owner to add members of that collaboration team to the shared collaborative channel.

Specifically, the link generator 532 is configured to generate a custom link to the shared collaborative channel for each invitee. The custom link is generated based on the identity of the respective invitee. For example, if the invitee is an individual, the identity of the invitee may include an identifier of an organization that the individual belongs to, an identifier of the individual, and an email address of the individual. In other example, if the invitee is another collaboration team (e.g., a recipient collaboration team) within or outside of the originating organization, the identity of the invitee may include an identifier of an organization to which the recipient collaboration team belongs, a recipient collaboration team identifier, and an email address associated with the recipient collaboration team (e.g., an email address of a team member of the recipient collaboration team). Accordingly, a custom link for an invitee may include, among other things, an identifier of the organization that the invitee belongs to, an invitee identifier, an email address of the invitee, and a display name of the shared collaborative channel. The display name of the shared collaborative channel is a channel name that appears to one or more individuals who have access to the shared collaborative channel.

The link establisher 534 is configured to establish a link between a shared collaborative channel and an invitee who was invited or added to the shared collaborative channel via a custom link. To do so, the link establisher 534 adds a custom link to a substrate group associated with the shared collaborative channel. Specifically, the link establisher 534 adds a custom link that points to a respective member of the shared collaborative channel to the substrate group, thereby adding a member into the substrate group. In aspects, the invitee may be added to the substrate group upon acceptance of the invitation.

The policy determiner 536 is configured to update one or more policies associated with one or more organizations to which one or more members of a respective collaborative channel belong. The policy determiner 536 may further determine whether members of a respective collaborative channel are in compliance with policies associated with the respective collaborative channel. For example, the policy determiner 536 may determine whether a member is qualified to make a request to add another individual or another collaboration team to a given shared collaborative channel (e.g., a given substrate group associated with the shared collaborative channel). In some aspects, the policy determiner 536 may further configured to determine whether a member to be added to a shared collaborative channel (e.g., added to a substrate group associated with the shared collaborative channel) is in compliance with a cross-tenant access policy. The policy determiner 536 may be configured to assign a set of rights to each members of the collaborative channel based at least in part on a type of the shared collaborative channel and an identity of the individual (e.g., within or outside the collaboration team, internal or external to the organization). Additionally, the policy determiner 536 may further be configured to determine whether an individual who is trying to view and/or access content of a collaborative channel is authorized by an applicable policy to do so.

Figure 6:
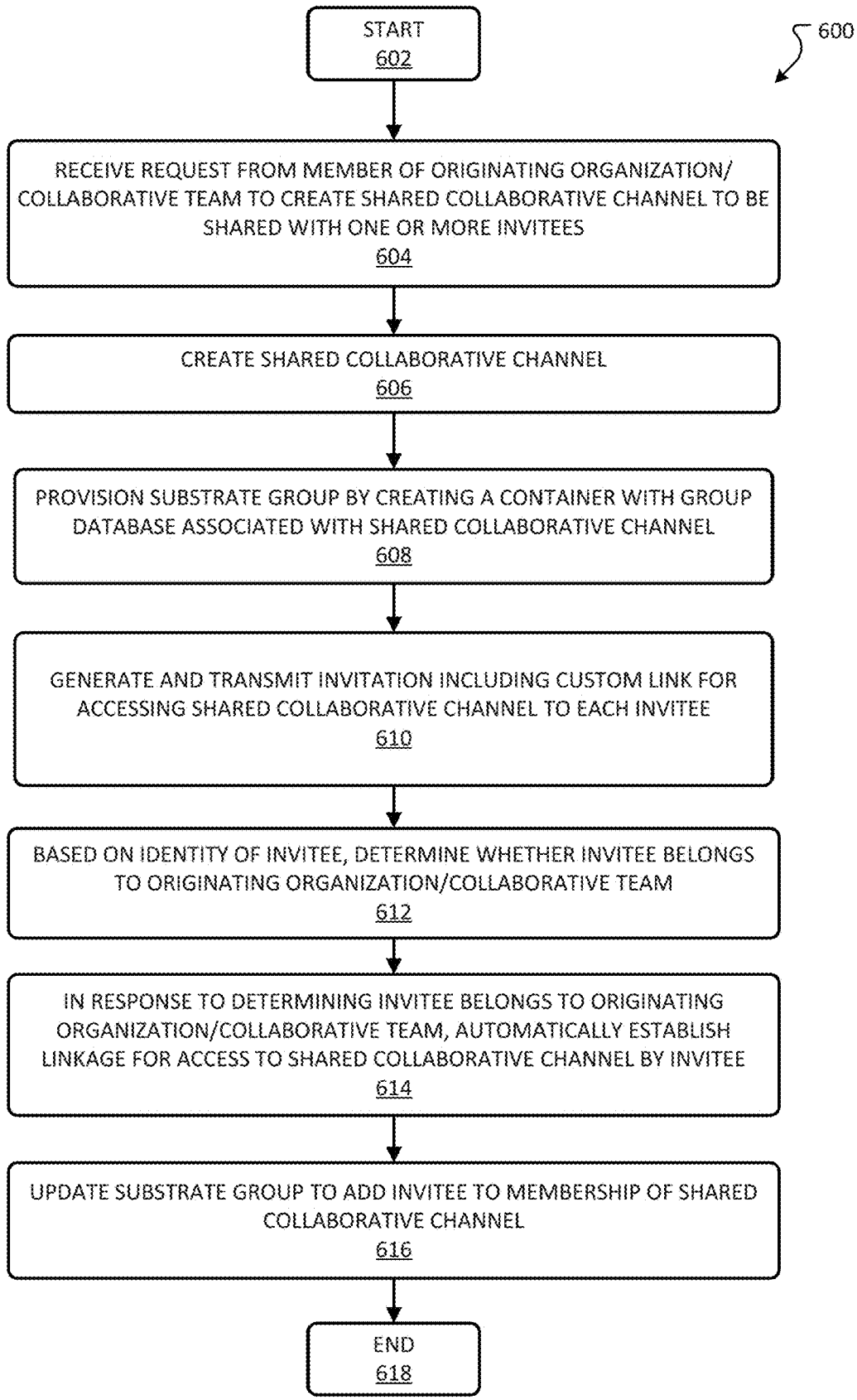
FIG. 6 depicts a method directed to creating a shared collaborative channel for collaboration in accordance with examples of the present disclosure.

Referring now to FIG. 6, a method 600 for creating a shared collaborative channel in accordance with examples of the present disclosure is provided. A general order for the steps of the method 600 is shown in FIG. 6. Generally, the method 600 starts at 602 and ends at 618. The method 600 may include more or fewer steps or may arrange the order of the steps differently than those shown in FIG. 6. In the illustrative aspect, the method 600 is performed by a server (e.g., a collaborative platform server 110, 800). For example, the collaborative platform server may be, but is not limited to, a web-server, a server instance on a cloud platform, a cloud-enabled operating system, or any other suitable computing device that is capable of communicating with one or more computing devices (e.g., a computing device 130) associated with one or more members (e.g., 120) of one or more organizations. For example, the collaborative platform server may be any suitable computing device that is capable of communicating with the computing device. As described above, in some aspects, the collaborative platform server may be a group of servers that are communicatively coupled to one another. The method 600 can be executed as a set of computer-executable instructions executed by a computer system and encoded or stored on a computer readable medium. Further, the method 600 can be performed by gates or circuits associated with a processor, Application Specific Integrated Circuit (ASIC), a field programmable gate array (FPGA), a system on chip (SOC), or other hardware device. Hereinafter, the method 600 shall be explained with reference to the systems, components, modules, software, data structures, user interfaces, etc. described in conjunction with FIG. 1.

The method 600 starts at 602, where flow may proceed to 604. At 604, the collaborative platform server receives a request from a member of an originating organization or collaboration team to create a shared collaborative channel to be shared with one or more invitees. It should be appreciated that the member requesting the shared collaborative channel is an originating owner of the shared collaborative channel from the originating collaboration team. The request includes an identity of each invitee who is being invited to the shared collaborative channel. It should be appreciated that an invitee may be an individual from the same originating collaboration team, an individual from a different recipient collaboration team in the same or different organization, or an individual from the same or different organization. Additionally, or alternatively, an invitee may be a collaboration team from the same organization or a collaboration team from a different organization. To invite another collaboration team from the same organization or a different organization, the request may include an identity of an individual who is a member of that internal or external collaboration team. Additionally, the identified individual may be granted rights of a designated owner to allow the identified individual to add one or more other members of the internal or external collaboration team to the shared collaborative channel.

In response to receiving the request, the method 600 proceeds to operation 606. It should be appreciated that operations 606-610 may be performed sequentially or simultaneously. In operation 606, the collaborative platform server creates a shared collaborative channel associated with the originating owner and the originating collaboration team. To do so, in operation 608, the collaborative platform server provisions a substrate group by creating a container with a substrate database for the shared collaborative channel. However, it should be appreciated that the originating owner may invite all or a subset of the members of the originating collaboration team to be members of the shared collaborative channel.

As described above, by creating a shared collaborative channel with its own substrate group, the originating owner (or, in some cases, a designated owner) may define policies (e.g., content permissions and/or channel rights) for each individual invited to the shared collaborative channel). For instance, an individual may be added to a shared collaborative channel with limited access (e.g., read access) to some or all content associated with the shared collaborative channel. It should be appreciated that this is a significant improvement over current collaborative systems where all channels within a collaboration team share the same roster and/or identity management directory. That is, conventionally, permissions and/or rights within a channel were governed by the general policies of an organization and/or a collaboration team based on a general (organization-wide) management directory. In this case, an individual outside of the collaboration team would be treated as a "guest" to the collaboration team and/or the collaborative channel and permissions and/or rights of the individual may be based on the role of "guest" rather than being more customizable by the originating owner or designated owners of the shared collaborative channel.

In operation 610, the collaborative platform server generates and transmits an invitation including a custom link for accessing the shared collaborative channel to each invitee. The custom link is generated based on the identity of the respective invitee. The identity of the invitee may include, among other things, an identifier of the organization that the invitee belongs to, an invitee (e.g., user) identifier, an email address of the invitee, and a display name of the shared collaborative channel, for example. The display name of the shared collaborative channel may be a channel name that appears to one or more individuals who have access to the shared collaborative channel.

For example, if the invitee is an individual, the identity of the invitee may include an identifier of an organization that the individual belongs to, an identifier of the individual, and an email address of the individual. The custom link may include the identity of the invitee and a display name of the shared collaborative channel. In such an example, the collaborative platform server may present a list of collaboration teams that the individual is an owner/member of and allow the individual to choose which one or more collaboration teams to mount the shared collaborative channel to (e.g., to associate the shared collaborative channel with a collaborative team). A number of collaboration teams that the individual may choose to mount the shared collaborative channel may depend on one or more policies defined in the collaborative platform server. It should be appreciated that mounting the shared collaborative channel to a particular collaboration team allows the individual to access the shared collaborative channel directly from the particular collaboration team. It should be appreciated that, mounting the shared collaborative channel to the particular collaboration does not allow other team members of the particular collaboration to access the shared collaborative channel. In some aspects, the individual may invite one or more team members of the particular collaboration team to the shared collaborative channel depending on the policies.

In other example, if the invitee is another collaboration team (e.g., a recipient collaboration team) within or outside of the originating organization, the identity of the invitee may include an organization identifier that the recipient collaboration team belongs to, a recipient collaboration team identification number, and an email address (or other user identifier) associated with a member of the recipient collaboration team. The custom link may include the identity of the invitee and a display name of the shared collaborative channel. In such an example, the team member receiving the custom link invite may be a designated owner for the recipient collaboration team and may choose one or more team members of the recipient collaboration team with whom to share the invitation to the shared collaborative channel. In other words, the designated owner may decide which team members of the recipient collaboration team may access the shared collaborative channel. This allows the owner of the originating collaboration team to collaborate with another collaboration team without needing to receive identifying information for each and every team members of the recipient collaboration team for them to be added to the shared collaborative channel. In some aspects, a number of team members that may be authorized to access the shared collaborative channel may be defined by the policies.

Subsequently, in operation 612, the collaborative platform server determines whether the invitee belongs to the same originating organization or collaborative team based on the identity of the invitee. In response to determining that the invitee belongs to the same originating organization or collaborative team, in operation 614, the collaborative platform server automatically establish a linkage for access to the shared collaborative channel by the invitee.

For example, if the invitee is an individual or another collaboration team within the same originating organization, the linkage may be automatically established between the shared collaborative channel and the invitee upon transmitting the custom link to the invitee. If, however, the invitee is an individual or another collaboration team outside of the originating organization, the linkage may be established between the shared collaborative channel and the invitee when the invitation is accepted by the invitee.

Alternatively, if the invitee is a member of the same originating collaborative team, the linkage may be automatically established between the shared collaborative channel and the invitee upon transmitting the custom link to the invitee. If, however, the invitee is not a member of the same originating collaborative team, the linkage may be established between the shared collaborative channel and the invitee when the invitation is accepted by the invitee.

In some aspects, when the invitee accepts the invitation to the shared collaborative channel, the collaborative platform server receives an acknowledgement from the invitee indicating one or more locations where the shared collaborative channel should be mounted. In some aspects, such information may be communicated to the originating owner of the shared collaborative channel. It should be appreciated that the custom link may not become active until the invitee accepts the link invite and passes compliance checks depending on the policies.

Once the linkage is established, the invitee is added as a new member of the shared collaborative channel. As such, in operation 616, the collaborative platform server updates the substrate group to sync the membership of the share collaborative channel to add the new member to the shared collaborative channel. It should be appreciated that if the invitation is not accepted by the invitee, the invitation may expire without updating the substrate database or establishing a linkage to the shared collaborative channel for the invitee. The method 600 may end at 618.

Figure 7:
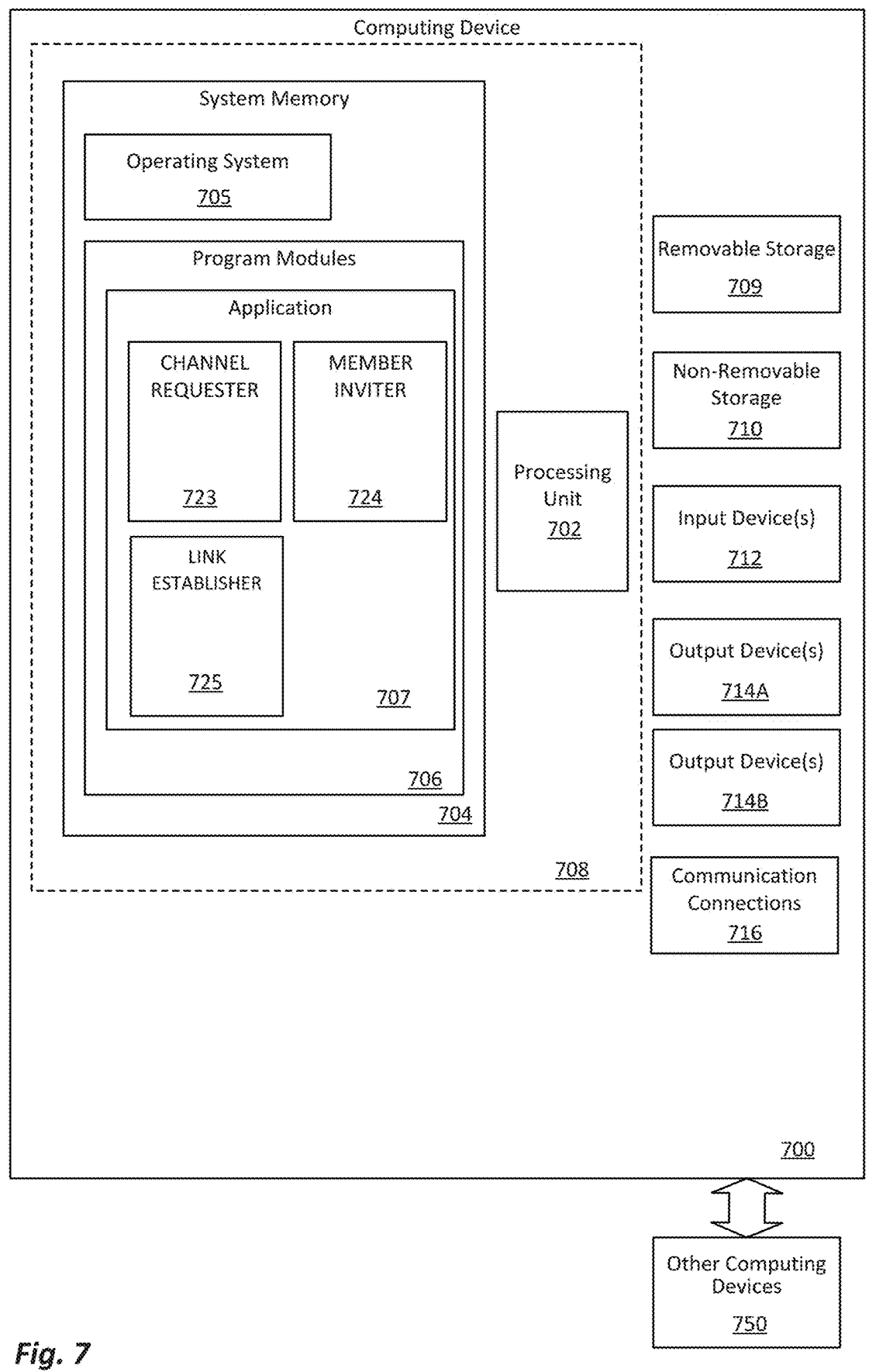
FIG. 7 depicts a block diagram illustrating physical components (e.g., hardware) of a computing device with which aspects of the disclosure may be practiced.
Figure 8A:
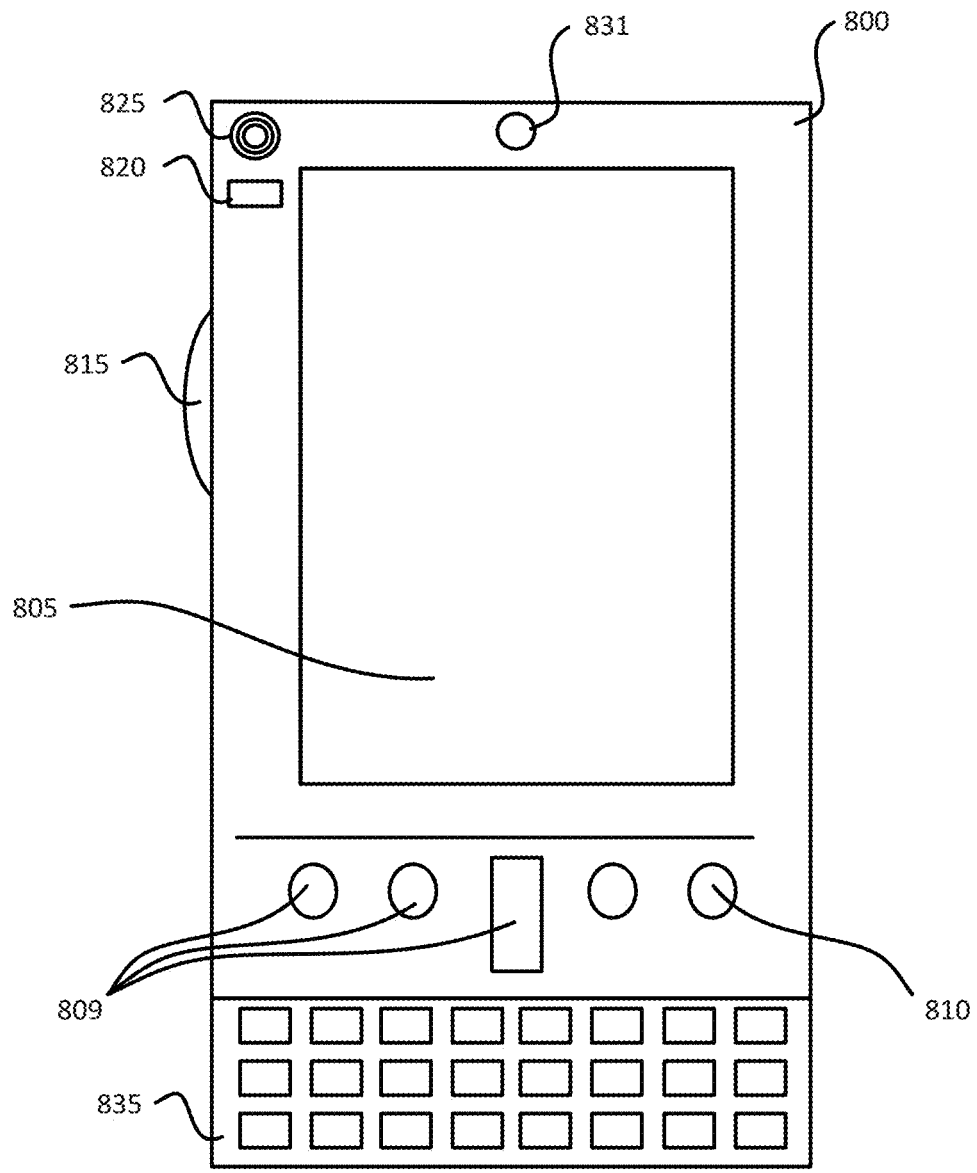
FIG. 8A illustrates a first example of a computing device with which aspects of the disclosure may be practiced.
Figure 8B:
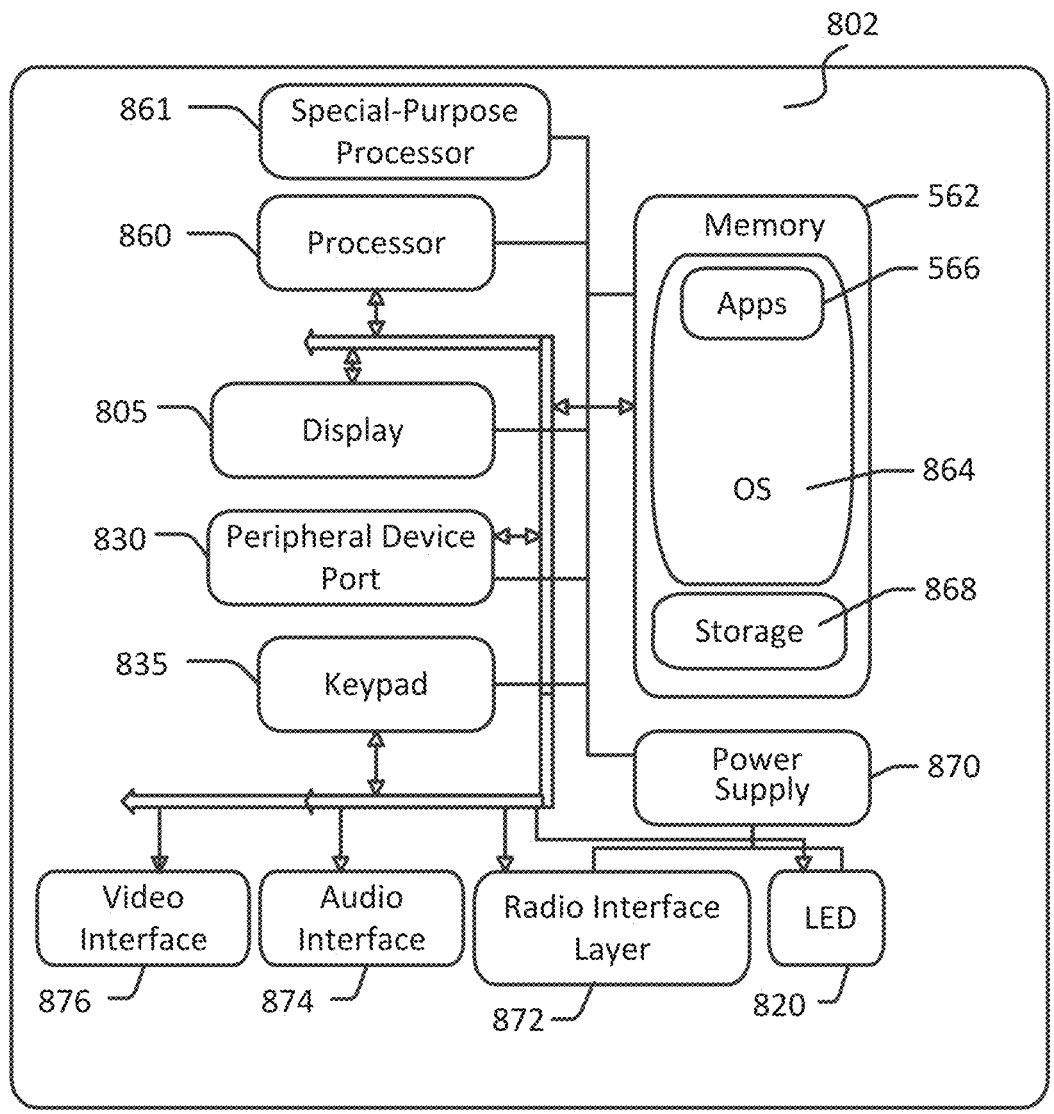
FIG. 8B illustrates a second example of a computing device with which aspects of the disclosure may be practiced.
Figure 9:
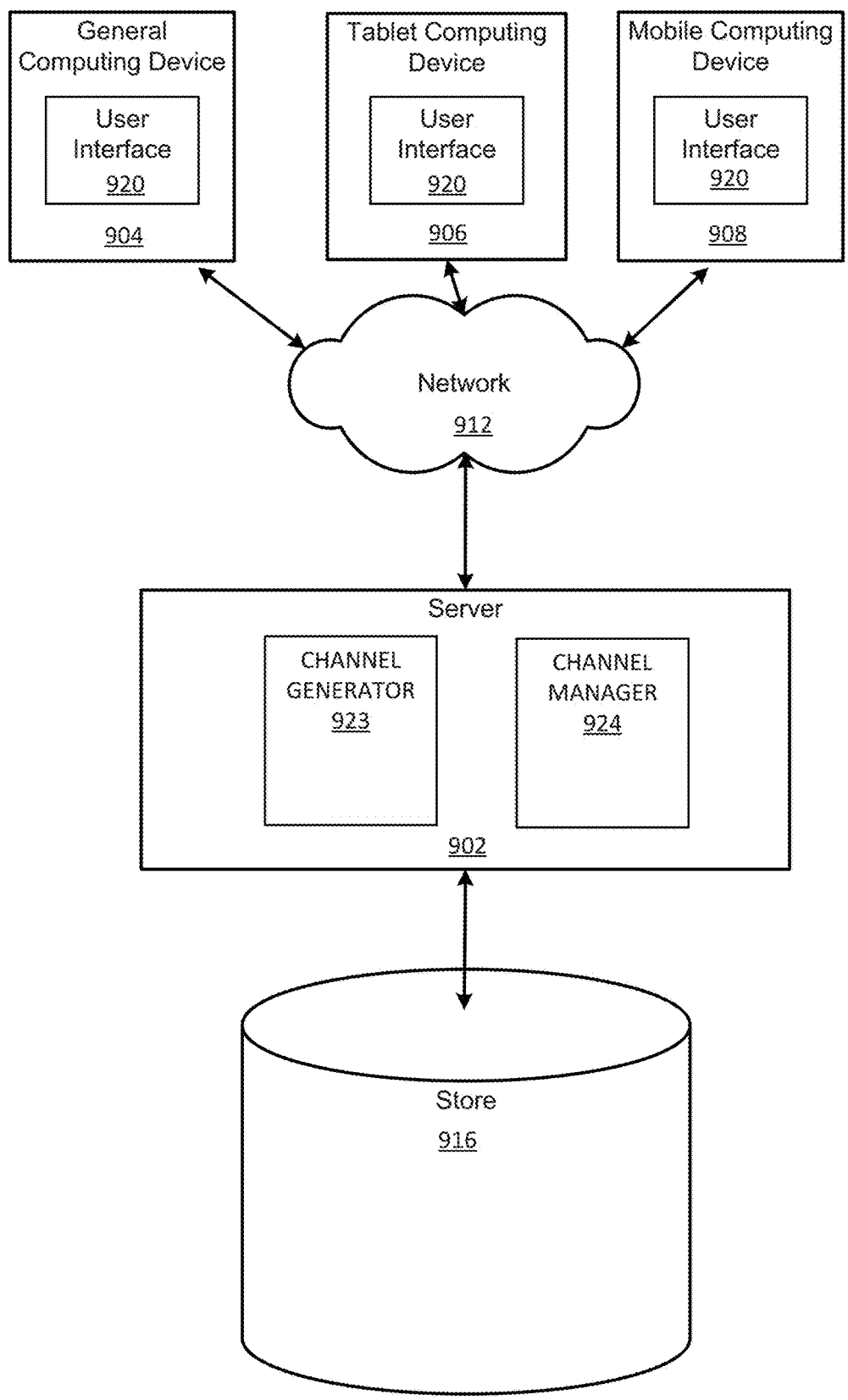
FIG. 9 illustrates at least one aspect of an architecture of a system for processing data in accordance with examples of the present disclosure.

FIGS. 7-9 and the associated descriptions provide a discussion of a variety of operating environments in which aspects of the disclosure may be practiced. However, the devices and systems illustrated and discussed with respect to FIGS. 7-9 are for purposes of example and illustration and are not limiting of a vast number of computing device configurations that may be utilized for practicing aspects of the disclosure, described herein.

FIG. 7 is a block diagram illustrating physical components (e.g., hardware) of a computing device 700 with which aspects of the disclosure may be practiced. The computing device components described below may be suitable for the computing devices described above. For example, the computing device 700 may represent the computing device 130 of FIG. 1. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, several program modules and data files may be stored in the system memory 704. While executing on the at least one processing unit 702, the program modules 706 may perform processes including, but not limited to, one or more aspects, as described herein. The application 720 includes a channel requester 723, a member inviter 724, and a link establisher 725. The channel requester 723 is configured to request a new collaborative channel. As described above, the new collaborative channel may be standard, private, or shared. A user associated with the computing device 700 (i.e., the individual who is creating the collaborative channel and is also referred to as an owner of the collaborative channel) may define the type of a collaborative channel when creating the collaborative channel.

The member inviter 724 is configured to invite a new invitee to a collaborative channel. To do so, the member inviter 724 may transmit a request to a collaborative platform server to generate a custom link to each new invitee. By doing so, the owner of the collaborative channel may invite and/or add a member of the collaboration team to a particular collaborative channel as a channel-only member. The channel-only member may not be a member of an originating collaboration team that the collaborative channel is linked to in an originating organization. However, the member inviter 724 allows the owner of the collaborative channel to add a member outside of the originating collaboration team to access the collaborative channel without grating access to the rest of the originating collaboration team.

The link establisher 725 is configured to establish a linkage between a shared collaborative channel and the user of the computing device 700. To do so, the link establisher 725 may receive a custom link to the shared collaborative channel when the user of the computing device 700 is invited to the shared collaborative channel. In some aspects, the linkage may be established automatically upon receiving the custom link. For example, if the shared collaborative channel is within the same organization, the linkage may be automatically established between the shared collaborative channel and the user. In other aspects, the linkage is established when the user choose to link the shared collaborative channel to one or more of the user's collaboration teams. For example, if the shared collaborative channel that the user is invited to is from outside of the user's organization, the linkage may be established between the shared collaborative channel and the user when the user accepts the invitation. In some aspects, when the user accepts the invitation to the shared collaborative channel, the link establisher 725 may transmit an acknowledgement to the collaborative platform server and/or an owner of the shared collaborative channel indicating one or more locations where the shared collaborative channel has been linked to.

Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 700 may also have one or more input device(s) 712 such as a keyboard, a mouse, a pen, a sound or voice input device, a touch or swipe input device, etc. The output device(s) 714A such as a display, speakers, a printer, etc. may also be included. An output 714B, corresponding to a virtual display may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media (e.g., non-transitory media). Computer storage media may include non-transitory, volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 809/810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 831 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports 830, such as an audio input (e.g., a microphone jack), an audio output (e.g., a headphone jack), and a video output (e.g., a HDMI port) for sending signals to or receiving signals from an external source.

FIG. 8B is a block diagram illustrating the architecture of one aspect of computing device, a server, or a mobile computing device. That is, the mobile computing device 800 can incorporate a system (902) (e.g., an architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and/or one or more components supported by the systems described herein. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g. a channel requester 723, a member inviter 724, and a link establisher 725, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860/961 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, the computing device 904, 906, 908 may represent the computing device 130 of FIGS. 1-3, and the server device 902 may represent the collaborative platform server 110 of FIG. 1.

In some aspects, one or more of a channel generator 923 and a channel manager 924, may be employed by server device 902. The server device 902 may provide data to and from a client computing device such as a personal computer 904, a tablet computing device 906 and/or a mobile computing device 908 (e.g., a smart phone) through a network 912. By way of example, the computer system described above may be embodied in a personal computer 904, a tablet computing device 906 and/or a mobile computing device 908 (e.g., a smart phone). Any of these aspects of the computing devices may obtain content from the store 916, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The example systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the example aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Example hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

In accordance with at least one example of the present disclosure, a method for generating a shared collaborative channel for collaboration is provided. The method may include receiving a request, from an originating member in an originating organization, to create the shared collaborative channel, the request including an invitee to be added to the shared collaborative channel, in response to receiving the request, provisioning a substrate group by creating a container including a substrate database associated with the shared collaborative channel, the substrate database including a membership roster of the shared collaborative channel, generating an invitation including a custom link for accessing the shared collaborative channel by the invitee, the custom link indicating an identity of the invitee, based on the identity of the invitee, determining whether the invitee belongs to the originating organization based on an organizational database, and in response to determining that the invitee belongs to the originating organization, (i) updating the membership roster of the substrate database to add the invitee as a new member of the shared collaborative channel and (ii) based on the custom link, automatically establishing a linkage for access to the shared collaborative channel by the invitee.

In accordance with at least one aspect of the above method, the method may include in response to determining that the invitee does not belong to the originating organization, determining whether the invitee has accepted the invitation, and in response to determining that the invitee has accepted the invitation, updating the substrate group to add the invitee as a new member of the shared collaborative channel.

In accordance with at least one aspect of the above method, the method may include in response to determining that the invitee does not belong to the originating organization, determining whether the invitee has accepted the invitation, and in response to determining that the invitee has accepted the invitation, establishing a linkage for access to the shared collaborative channel by the invitee.

In accordance with at least one aspect of the above method, the method may include in response to determining that the invitee does not belong to the originating organization, determining whether the invitee has accepted the invitation, and in response to determining that the invitee has not accepted the invitation, allowing the invitation to expire without updating the substrate database or establishing a linkage to the shared collaborative channel for the invitee.

In accordance with at least one aspect of the above method, the method may include where the invitee is one of an individual from the originating collaboration team, an individual from a different collaboration team in the same organization, or an individual from a different organization.

In accordance with at least one aspect of the above method, the method may include where the invitee is a recipient collaboration team from the originating organization or a different organization, and where one or more members from the recipient collaboration team are selected to be added to the shared collaborative channel.

In accordance with at least one aspect of the above method, the method may include where the identity of the invitee includes an organization identifier of the invitee and an invitee identifier.

In accordance with at least one aspect of the above method, the method may include where the substrate group is associated with an independent identity management directory that includes a list of members that are authorized to access resources or content associated with the shared collaborative channel.

In accordance with at least one example of the present disclosure, a computing device generating a shared collaborative channel for collaboration is provided. The computing device may include a processor and a memory having a plurality of instructions stored thereon that, when executed by the processor, causes the computing device to receive a request, from an originating member of an organization, to create the shared collaborative channel, the request including an invitee to be added to the shared collaborative channel, in response to receipt of the request, provision a substrate group by creating a container associate with the shared collaborative channel including a substrate database associated with the shared collaborative channel, the substrate database including a membership roster of the shared collaborative channel, generate an invitation including a custom link to the shared collaborative channel for the invitee, determine whether the invitee belongs to an originating collaboration team associated with the originating member based on the substrate database, and in response to a determination that the invitee belongs to the originating collaboration team, update the substrate group to add the invitee as a new member of the shared collaborative channel.

In accordance with at least one aspect of the above computing device, the computing device may include where the plurality of instructions when executed further cause the computing device to in response to a determination that the invitee belongs to the originating collaboration team, automatically establish a linkage for access to the shared collaborative channel by the invitee based on the custom link.

In accordance with at least one aspect of the above computing device, the computing device may include where the plurality of instructions when executed further cause the computing device to in response to a determination that the invitee does not belong to the originating collaboration team, determine whether the invitee has accepted the invitation, and in response to a determination that the invitee has accepted the invitation (i) update the substrate group to add the invitee as a new member of the shared collaborative channel, and (ii) establish a linkage for access to the shared collaborative channel by the invitee.

In accordance with at least one aspect of the above computing device, the computing device may include where to determine whether the invitee has accepted the invitation comprises causing the computing device to determine whether the custom link included in the invitation has been added to a collaborative environment of the invitee.

In accordance with at least one aspect of the above computing device, the invitee may be a recipient collaboration team from the originating organization or a different organization, and one or more members from the recipient collaboration team are selected to be added to the shared collaborative channel.

In accordance with at least one aspect of the above computing device, the identity of the invitee may include an organization identifier of the invitee and an invitee identifier.

In accordance with at least one aspect of the above computing device, the substrate group may be associated with an independent identity management directory that includes a list of members that are authorized to access resources or content associated with the shared collaborative channel In accordance with at least one example of the present disclosure, a non-transitory computer-readable medium storing instructions for generating a shared collaborative channel for collaboration is provided. The instructions when executed by one or more processors of a computing device, cause the computing device to perform operations, including receiving a request, from an originating member in an originating organization, to create the shared collaborative channel, the request including an invitee to be added to the shared collaborative channel, in response to receiving the request, provisioning a substrate group by creating a container including a substrate database associated with the shared collaborative channel, the substrate database including a membership roster of the shared collaborative channel, generating an invitation including a custom link for accessing the shared collaborative channel by the invitee, the custom link indicating an identity of the invitee, based on the identity of the invitee, determining whether the invitee belongs to an originating organization based on an organizational database, and in response to determining that the invitee belongs to the originating organization updating the membership roster of the substrate database to add the invitee as a new member of the shared collaborative channel, wherein the substrate group is associated with an independent identity management directory that includes a list of members that are authorized to access resources or content associated with the shared collaborative channel.

In accordance with at least one aspect of the above non-transitory computer-readable medium, the instructions when executed by the one or more processors may further cause the computing device to perform operations including in response to determining that the invitee belongs to the originating organization, automatically establishing a linkage for access to the shared collaborative channel by the invitee based on the custom link.

In accordance with at least one aspect of the above non-transitory computer-readable medium, the instructions when executed by the one or more processors may further cause the computing device to perform operations including in response to determining that the invitee does not belong to the originating organization, determining whether the invitee has accepted the invitation, in response to determining that the invitee has accepted the invitation (i) updating the substrate group to add the invitee as a new member of the shared collaborative channel, and (ii) establishing a linkage for access to the shared collaborative channel by the invitee.

In accordance with at least one aspect of the above non-transitory computer-readable medium, the invitee may be a recipient collaboration team from the originating organization or a different organization, and one or more members from the recipient collaboration team are selected to be added to the shared collaborative channel.

In accordance with at least one aspect of the above non-transitory computer-readable medium, the identity of the invitee may include an organization identifier of the invitee and an invitee identifier The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

What is claimed is:

1. A method for generating a shared collaborative channel for collaboration, the method comprising:
    receiving a request, from an originating member in an originating organization, to create the shared collaborative channel, the request including an invitee to be added to the shared collaborative channel;
    in response to receiving the request, generating the shared collaborative channel within a collaboration environment shared among members of a collaboration team within the originating organization, wherein the originating member is a member of a collaboration team within the originating organization, and wherein the invitee is a member of the same collaboration team within the originating organization, a different collaboration team within the originating organization, or a different external organization;
    provisioning a group by creating a container including a database associated with the shared collaborative channel, the database including a membership roster of the shared collaborative channel;
    generating an invitation including a custom link for accessing the shared collaborative channel by the invitee, the custom link indicating an identity of the invitee;
    establishing a linkage for access to the shared collaborative channel by the invitee based on the custom link; and
    assigning a set of rights to the invitee for accessing content of the shared collaborative channel based at least in part on which collaboration team and organization the invitee belongs to.

2. The method of claim 1, wherein establishing the linkage for access to the shared collaborative channel by the invitee based on the custom link comprises:
    determining whether the invitee belongs to the originating organization based on an organizational database;
    in response to determining that the invitee does not belong to the originating organization, determining whether the invitee has accepted the invitation; and
    in response to determining that the invitee has accepted the invitation, establishing the linkage for access to the shared collaborative channel by the invitee.

3. The method of claim 2, further comprising:
    in response to determining that the invitee has accepted the invitation, updating the group to add the invitee as a new member of the shared collaborative channel.

4. The method of claim 2, further comprising:
    in response to determining that the invitee has not accepted the invitation, allowing the invitation to expire without updating the database or establishing a linkage to the shared collaborative channel for the invitee.

5. The method of claim 1, wherein the invitee is one of an individual from a originating collaboration team associated with the originating member based on the database, an individual from a different collaboration team in the same organization, or an individual from a different organization.

6. The method of claim 1, wherein the invitee is a recipient collaboration team from the originating organization or a different organization, and wherein one or more members from the recipient collaboration team are selected to be added to the shared collaborative channel.

7. The method of claim 1, wherein the identity of the invitee includes an organization identifier of the invitee and an invitee identifier.

8. The method of claim 1, wherein the group is associated with an independent identity management directory that includes a list of members that are authorized to access resources or content associated with the shared collaborative channel.

9. A computing device for generating a shared collaborative channel for collaboration, the computing device comprising:
    a processor; and
    a memory having a plurality of instructions stored thereon that, when executed by the processor, causes the computing device to:
    receive a request, from an originating member in an originating organization, to create the shared collaborative channel, the request including an invitee to be added to the shared collaborative channel;
    in response to the request being received, generate the shared collaborative channel within collaboration environment shared among members of a collaboration team within the originating organization, wherein the originating member is a member of a collaboration team within the originating organization, and wherein the invitee is a member of the same collaboration team within the originating organization, a different collaboration team within the originating organization, or a different external organization;
    provision a group by creating a container including a database associated with the shared collaborative channel, the database including a membership roster of the shared collaborative channel;

generate an invitation including a custom link for accessing the shared collaborative channel by the invitee, the custom link indicating an identity of the invitee;

establish a linkage for access to the shared collaborative channel by the invitee based on the custom link; and assign a set of rights to the invitee for accessing content of the shared collaborative channel based at least in part on which collaboration team and organization the invitee belongs to.

10. The computing device of claim 9, wherein to establish the linkage for access to the shared collaborative channel by the invitee based on the custom link comprises to:

determine whether the invitee belongs to the originating organization based on an organizational database;

in response to a determination that the invitee does not belong to the originating organization, determine whether the invitee has accepted the invitation; and in response to a determination that the invitee has accepted the invitation, establish the linkage for access to the shared collaborative channel by the invitee.

11. The computing device of claim 10, wherein the plurality of instructions when executed further cause the computing device to:

in response to determining that the invitee has accepted the invitation, updating the group to add the invitee as a new member of the shared collaborative channel.

12. The computing device of claim 10, wherein the plurality of instructions when executed further cause the computing device to:

in response to determining that the invitee has not accepted the invitation, allowing the invitation to expire without updating the database or establishing a linkage to the shared collaborative channel for the invitee.

13. The computing device of claim 10, wherein to determine whether the invitee has accepted the invitation comprises causing the computing device to determine whether the custom link included in the invitation has been added to a collaborative environment of the invitee.

14. The computing device of claim 9, wherein the invitee is a recipient collaboration team from the originating organization or a different organization, and one or more members from the recipient collaboration team are selected to be added to the shared collaborative channel.

15. The computing device of claim 9, wherein the group is associated with an independent identity management directory that includes a list of members that are authorized to access resources or content associated with the shared collaborative channel.

16. A non-transitory computer-readable medium storing instructions for generating a shared collaborative channel for collaboration, the instructions when executed by one or more processors of a computing device, cause the computing device to perform operations, comprising:

receiving a request, from an originating member in an originating organization, to create the shared collaborative channel, the request including an invitee to be added to the shared collaborative channel;

in response to receiving the request, generating the shared collaborative channel within collaboration environment shared among members of a collaboration team within the originating organization, wherein the originating member is a member of a collaboration team within the originating organization, and wherein the invitee is a member of the same collaboration team within the originating organization, a different collaboration team within the originating organization, or a different external organization;

provisioning a group by creating a container including a database associated with the shared collaborative channel, the database including a membership roster of the shared collaborative channel;

generating an invitation including a custom link for accessing the shared collaborative channel by the invitee, the custom link indicating an identity of the invitee;

establishing a linkage for access to the shared collaborative channel by the invitee based on the custom link; and assigning a set of rights to the invitee for accessing content of the shared collaborative channel based at least in part on which collaboration team and organization the invitee belongs to, wherein the group is associated with an independent identity management directory that includes a list of members that are authorized to access resources or content associated with the shared collaborative channel.

17. The non-transitory computer-readable medium of claim 16, wherein to establish the linkage for access to the shared collaborative channel by the invitee based on the custom link comprises to:

determine whether the invitee belongs to the originating organization based on an organizational database;

in response to a determination that the invitee does not belong to the originating organization, determine whether the invitee has accepted the invitation; and in response to a determination that the invitee has accepted the invitation, establish the linkage for access to the shared collaborative channel by the invitee.

18. The non-transitory computer-readable medium of claim 17, wherein the operations further comprise:

in response to determining that the invitee has accepted the invitation, updating the group to add the invitee as a new member of the shared collaborative channel.

19. The non-transitory computer-readable medium of claim 17, wherein the operations further comprise:

in response to determining that the invitee has not accepted the invitation, allowing the invitation to expire without updating the database or establishing a linkage to the shared collaborative channel for the invitee.

20. The non-transitory computer-readable medium of claim 16, wherein the invitee is a recipient collaboration team from the originating organization or a different organization, and one or more members from the recipient collaboration team are selected to be added to the shared collaborative channel.

* * * * *